United States Patent

Nakamura et al.

[11] Patent Number: 5,900,559
[45] Date of Patent: May 4, 1999

[54] SYNCHRONIZER RING

[75] Inventors: Yoshikatsu Nakamura; Tetsuo Masuyama, both of Shimotsuga-gun, Japan

[73] Assignee: Nippon Piston Ring Co., Ltd., Tokyo, Japan

[21] Appl. No.: 08/919,817

[22] Filed: Aug. 29, 1997

[30] Foreign Application Priority Data

Aug. 30, 1996 [JP] Japan ................................ 8-230208

[51] Int. Cl.$^6$ .............................. B22F 3/24; C22C 29/00
[52] U.S. Cl. ...................... 75/232; 75/246; 192/107 M
[58] Field of Search ....................... 192/107 M; 75/232, 75/246

[56] References Cited

U.S. PATENT DOCUMENTS

| | | | |
|---|---|---|---|
| 3,802,849 | 4/1974 | Kimura et al. | 29/182.2 |
| 4,943,321 | 7/1990 | Akutsu | 75/243 |
| 4,951,798 | 8/1990 | Knoess | 192/107 M |
| 5,337,872 | 8/1994 | Kawamura et al. | 192/107 M |
| 5,370,725 | 12/1994 | Kawamura et al. | 75/243 |

FOREIGN PATENT DOCUMENTS 37 05661 A1  6/1988  Germany .

46-15043  4/1971  Japan .

Primary Examiner—Daniel J. Jenkins

[57] ABSTRACT

In an aspect of the present invention, a synchronizer ring, made of Fe-based sintered alloy, having an internal circumferential surface 101, is provided, the internal circumferential surface 101 being adapted to detachably engage in synchronized sliding with a rotating counterpart member thereof. At least the internal circumferential surface 101 is applied with aqueous vapor treatment to form iron oxide film thereon. In another aspect of the present invention, the iron oxide film has surface roughness not less than 20 $\mu$mRz but not more than 55 $\mu$mRz. In a further aspect of the present invention, the iron oxide film has a surface roughness not less than 25 $\mu$mRz but not more than 35 $\mu$mRz. In another aspect of the present invention, the iron oxide film has a thickness not less than 0.05 $\mu$m but not more than 5 $\mu$m. In a further aspect of the present invention, the major component of the iron oxide film is $Fe_3O_4$. In a still further aspect of the present invention, at least the internal circumferential surface is applied with blasting treatment in addition to, and in combination with, the aqueous vapor treatment to form iron oxide film thereon.

15 Claims, 3 Drawing Sheets

Coefficient of Friction

SYNCHRONIZER RING

FIELD OF THE INVENTION

The present invention relates to a synchronizer ring made of Fe-based sintered alloy, and, more particularly, to such synchronizer ring that have excellent frictional characteristics and scuffing resistance, and, besides, being easy to work and having stable quality.

BACKGROUND OF THE INVENTION

Synchronizer rings have been conventionally used, for example, in synchromesh gear transmissions. Such synchronizer ring is a friction ring that engages in synchronized sliding with its rotating counterpart member, for example, a tapered cone, and disengages with the tapered cone. The ring plays an important role in synchronization of peripheral speeds of two mutually engaged gears. A synchronizer ring is known to have a structure, as shown in FIG. 1, where multiple gear teeth 100, adapted to engage with a counterpart member (not shown), are disposed, with a predetermined spacing, on the external-most circumference of a synchronizer ring, an internal circumferential surface 101, adapted to make contact with a tapered cone (not shown) when engaged, has longitudinal grooves 103 disposed thereon, and, when required, ring-shaped thin stripe grooves 102 formed thereon at a right angle with longitudinal grooves 103, and an external circumferential surface has keyways 104 disposed thereon for a synchrozizer key (not shown) to fit. Brass (a Cu—Zn alloy) has been typically used as material for forming a synchronizer ring.

With a synchronizer ring having chances to be formed in such shape, for example, as one described above, it is typically required that the ring has high mechanical strength and precision, and, besides, its internal circumferential surface, adapted to make contact with its counterpart member when engaged, has both excellent frictional characteristics and ample scuffing resistance. Especially, in the field of automotive transmissions, since not only secured functionality but also luxurious and sportive feeling are looked for in the operation as transmissions recently tend to be more luxurious and have higher performance, a synchronizer ring is desired that has further improved frictional characteristics and scuffing resistance.

Thus, various types of synchronizer rings are being studied that are attempted to have frictional characteristics and scuffing resistance improved, compared to conventional synchronizer rings made of brass (a Cu—Zn alloy).

Specifically, a synchronizer ring is known where a layer is formed on its internal circumferential surface by means of a flame-spraying method, the layer being prepared by uniformly mixing metal with ceramics and oxide, and fusing them together, as disclosed in JP-B 46-15043. Also, as a method available for manufacturing synchronizer rings, for example, a method for manufacturing a friction ring is known where a friction lining is formed on its internal circumferential surface by means of a flame-injecting method, the lining comprising sintered powder containing an 80 weight percent of metallic component powder and a 20 weight percent of non-metallic component powder, as disclosed in DE-PS 3,705,661.

Furthermore, a synchronizer ring is also being studied that comprises Fe-based sintered alloy containing bainite, pearlite and free Cu-phase in its base body.

However, the required frictional characteristics and scuffing resistance have not been accomplished yet with such conventional synchronizer rings as disclosed above, including the synchronizer rings having a layer formed on its internal circumferential surface by means of a flame-spraying method, the layer being prepared by uniformly mixing metal with ceramics and oxide, and fusing them together, and the synchronizer rings obtained by employing the method for manufacturing a friction ring where a friction lining is formed on its internal circumferential surface by means of a flame-injecting method, the lining comprising sintered powder containing an 80 weight percent of metallic component powder and a 20 weight percent of non-metallic component powder.

Other problems also having been experienced are such as insufficient strength due to insufficient dispersion of each metallic component, and unstable quality due to irregularity in the material of flame-sprayed coating. Furthermore, particles incompletely fused in the flame, or splashed or rebounded particles, are often entrained in the surface layer of flame-sprayed coating. Such entrained particles cause such problems that frictional characteristics tend to vary as time elapses due to the surface made rough by the entrained particles, and various portions in the transmission are caused to wear due to the entrained particles dropping off. On the other hand, grinding and cutting were being applied to the surface of the flame-sprayed coating for reducing the surface roughness of the coating. Disadvantageously, however, such grinding or cutting caused high working cost and material loss due to working margin.

In addition, the synchronizer ring comprising Fe-based 6 sintered alloy containing bainite, pearlite and free Cu-phase in its base body, as discussed above, has disadvantage in that sizing is difficult to work due to high hardness of HRB 90 caused by the contained bainite. Besides, coefficient of dynamic friction still has room for improvement.

The present invention has been made to solve the problems and overcome disadvantages, described above. Thus, an object of the present invention is to provide a synchronizer ring having excellent frictional characteristics and scuffing resistance and stable quality.

SUMMARY OF THE INVENTION

In order to accomplish the object described above, in an aspect of the present invention, a synchronizer ring, made of Fe-based sintered alloy, having an internal circumferential surface, is provided, the internal circumferential surface being adapted to detachably engage in synchronized sliding with a rotating counterpart member thereof. At least the internal circumferential surface is applied with aqueous vapor treatment to form iron oxide film thereon.

In another aspect of the present invention, the iron oxide film has surface roughness not less than 20 $\mu$mRz but not more than 55 $\mu$mRz.

In a further aspect of the present invention, the iron oxide film has a surface roughness not less than 25 $\mu$mRz but not more than 35 $\mu$mRz.

In another aspect of the present invention, the iron oxide film has a thickness not less than 0.05 $\mu$m but not more than 5 $\mu$m.

In a further aspect of the present invention, the major component of the iron oxide film is $Fe_3O_4$.

In a still further aspect of the present invention, at least the internal circumferential surface is applied with blasting treatment in addition to, and in combination with, the aqueous vapor treatment to form iron oxide film thereon.

Thus, with a synchronizer ring so formed as described above, according to the present invention, excellent frictional characteristics, scuffing resistance and stable quality are obtained.

DESCRIPTION OF THE PREFERED EMBODIMENTS

Figure 1:
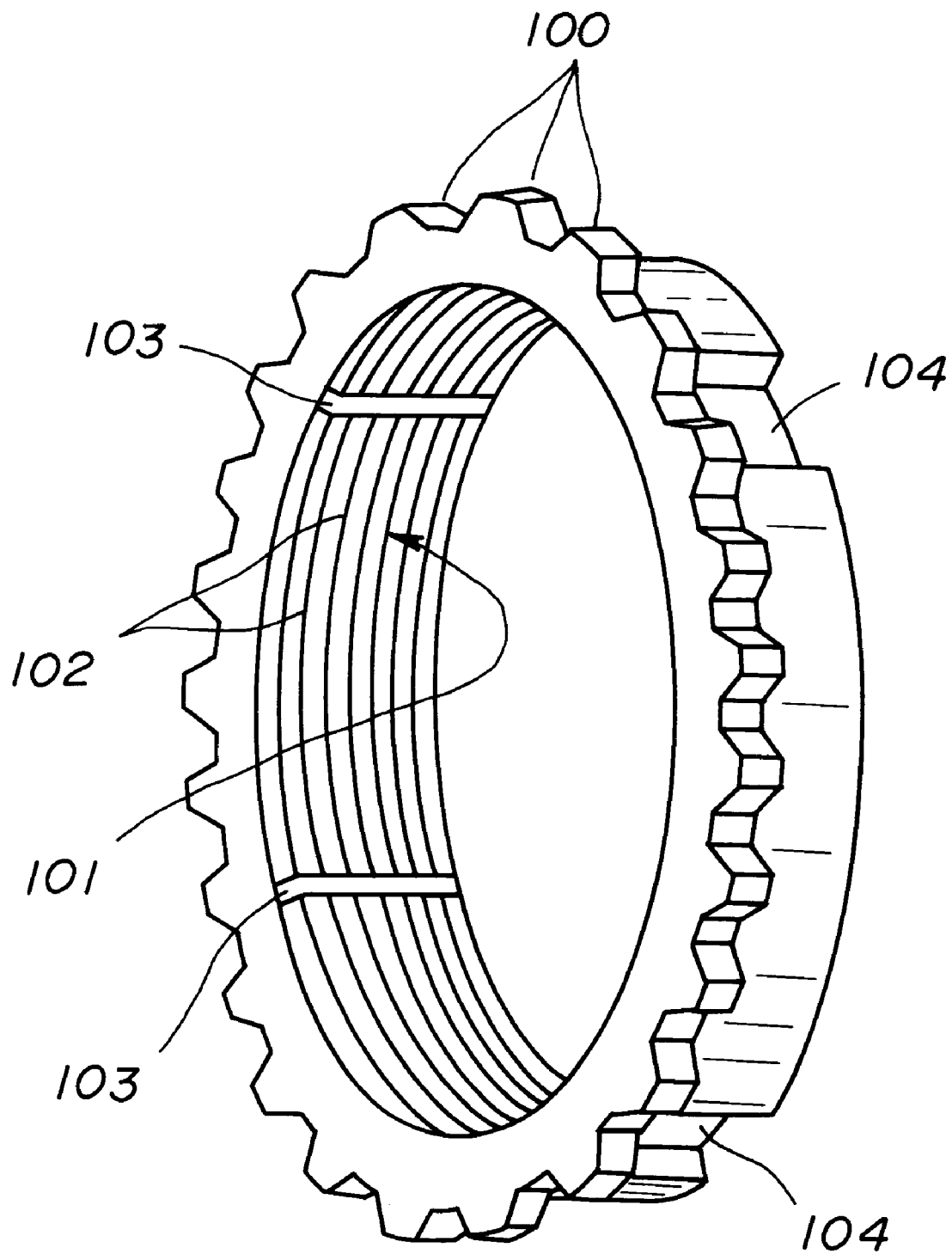
FIG. 1 is a perspective view of an illustrated synchronizer ring.

Hereunder, the present invention is described more in detail, referring to drawings attached hereto.

A sintered body for a synchronizer ring may be produced by steps of combining graphite powder, Cu powder, and Fe powder, normally having a grain size not more than 150 mesh, at a predetermined ratio; mixing those components under the normal conditions; then, pressing them under a pressure around 4.5 to 6.5 ton/cm2 to yield a green compact; and sintering the green compact at a temperature of around 1,000 to 1,200 deg.C. to produce a sintered body.

On an internal circumferential surface of a synchronizer ring comprising the sintered body, as described above, exist fine unevenness (protrusions and recesses) and numerous holes, and the surface roughness is in a range of 8 to 15 μmRz. When aqueous vapor treatment is applied to the internal circumferential surface at 550 to 600 deg.C. for 30 to 90 minutes, iron oxide film is formed on the surface irregularity, where the film mainly comprises $Fe_3O_4$, also containing $F_2O_3$, having numerous holes of around 1 μm inner diameter, surface roughness of 20 to 55 μmRz, and hardness of around Hv500.

Since an internal circumferential surface of a synchronizer ring has increased surface roughness, as described above, oil film formed on the contact area of the internal circumferential surface with its counterpart member is caused to have decreased thickness. As a result, boundary lubrication (metallic contact) state tends to occur, and is maintained, whereby coefficient of friction gets higher, nevertheless, scuffing is prevented by oiling effect caused by oil contained in the holes within the $Fe_3O_4$ film.

When blasting treatment and aqueous vapor treatment are applied to the internal circumferential surface, instead of only aqueous vapor treatment, oil film tends to be cut or broken, and, besides, passage for oil drain is also secured, whereby the internal circumferential surface and its counterpart member easily come into the boundary lubrication state. Also, by applying blasting treatment to the internal circumferential surface, the tip of protrusions on the surface layer of the internal circumferential surface tends to be deformed elastically, whereby the actual contact area between the internal circumferential surface and the external circumferential surface of its counterpart member increases, which enables the frictional force to be further increased.

While a synchronizer ring made of Fe-based sintered alloy has fine holes, a synchronizer ring, particularly, its internal circumferential surface that makes contact with a tapered cone, as its counterpart member, is required to be provided with frictional force, and, besides, scuffing resistance. With a synchronizer ring according to the present invention, at least its gear teeth may preferably have a theoretical density, or denseness, not less than 95% in view of strength, while other portions may preferably have a theoretical density not less than 90%.

The surface roughness of iron oxide film mainly comprising $Fe_3O_4$ may be preferably within a range of 20 to 55 μmRz, more preferably within a range of 25 to 35 μmRz. If the surface roughness is less than 20 μmRz, then, the coefficient of friction reaches a level of 0.08 very quickly, thereby causing a sort of rattling noise. On the other hand, if the surface roughness is more than 55 μmRz, then, the critical face pressure for scuffing decreases, and scuffing resistance gets lowered. If the surface roughness is within a range of 25 to 35 μmRz, then, chances to avoid such undesirable phenomena become higher. In addition, if the oxide film thickness is less than 0.05 μm, scuffing easily occurs, while, if the oxide film thickness is more than 5 μm, the increase in the critical face pressure for scuffing is insufficient.

Examples of Synchronizer Ring According to the Invention

Now, various synchronizer ring embodiments and their advantages, according to the present invention, are further described referring to various tests conducted in comparison with other reference synchronizer ring examples.

Test Pieces, Group 1:

A sintered body was produced for various synchronizer ring test pieces to be tested, through following steps. First, graphite powder, Cu powder, Fe-W powder, and Fe powder (low alloy steel powder), each having a grain size not more than 150 mesh, were prepared, and those components were mixed together under the normal condition, at a mixing ratio of: 0.9 weight percent for graphite powder, 10 weight percent for Cu powder, 10 weight percent for Fe-W powder, and the balance for Fe powder, to obtain a mixed powder. Then, the mixed powder was pressed under a pressure of 5 ton/cm$^2$ to form a green compact. Finally, the green compact was sintered by holding it at a temperature in a range of 1,000 to 1,200 deg.C. in the atmosphere of decomposed ammonium gas for 80 minutes, and, thus, a sintered body was obtained that had substantially the same components as the components in the original powder combination.

From the sintered body so obtained, a group (Group 1) of four different test pieces having different surface treatment were produced, comprising comparison test piece 1, differently treated from the present invention for comparison purpose, comparison test piece 2, embodiment test piece 1, treated according to the present invention, and embodiment test piece 2. Comparison test piece 1 was applied with no surface treatment, having surface roughness of 10 pmRz, and comparison test piece 2 was applied with blasting treatment, having surface roughness of 15 μmRz. Embodiment test piece 1 was applied with 550-deg.C. and 30-minute aqueous vapor treatment, thereby forming on its surface Fe oxide film mainly comprising $Fe_3O_4$, and having 3 μm thickness and surface roughness of 25 μmRz. Embodiment test piece 2 was applied with blasting treatment and 550-deg.C. and 30-minute aqueous vapor treatment, thereby forming on its surface Fe oxide film having surface roughness of 35 μmRz.

Figure 2:
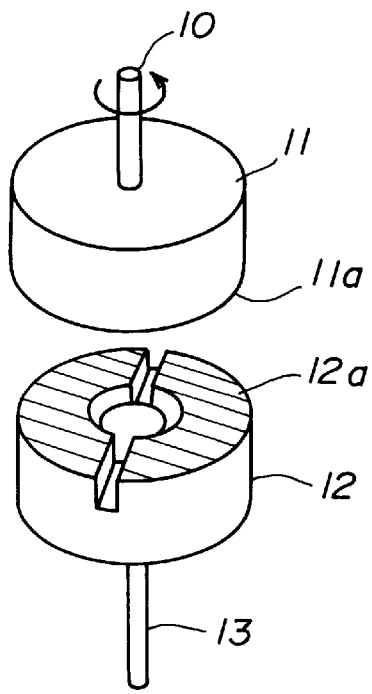
FIG. 2 is a schematic drawing of a sliding friction tester of cylinder-to-cylinder plane contact type.

Various tests were conducted for each test piece of Group 1, as follows:

Friction Tests for Group 1:

For each test piece of Group 1, the coefficient of friction was measured under the following conditions, using a sliding friction tester of cylinder-to-cylinder plane contact type, as shown in FIG. 2.

The measuring conditions were as follows:

Thrust load: 80 kgf.

Sliding speed: 1 m/s.

Lubricating oil: SAE75W-90.
Oil temperature: 90 deg.C.
Oiling method: dipping.
Counterpart member material: carbon steel JIS (Japanese Industrial Standards) SCM420, carburized, quench-and-tempered (surface hardness Hv(0.1)600).
Hardness: measured in Micro-Vickers.

In a sliding friction tester of cylinder-to-cylinder plane contact type, as shown in FIG. 2, numerical symbol 10 depicts a revolving shaft, 11a counterpart member, 11a a sliding surface of the counterpart member, 12a sintered body test piece, 12a a sliding surface of the test piece, and 13a stationary shaft.

Figure 3:
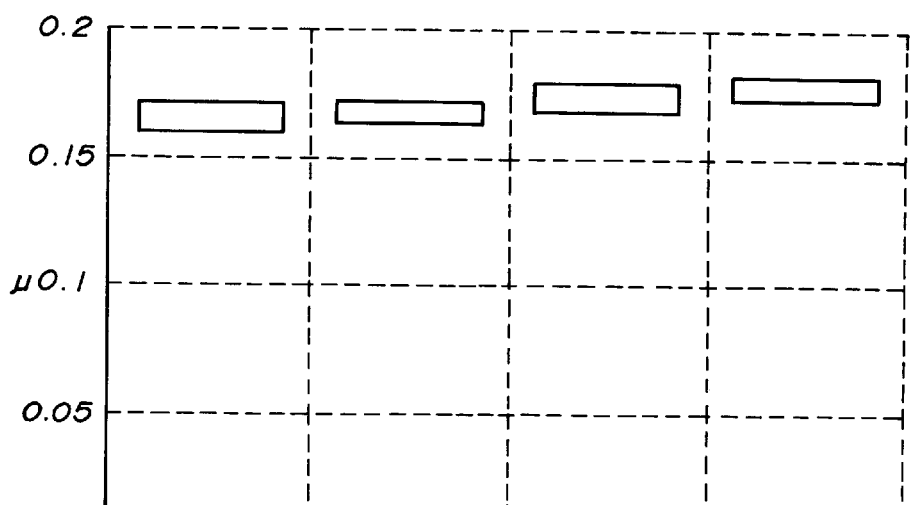
FIG. 3 is a graph showing coefficient of friction measured with the tester of FIG. 2.

A result for the tests is shown in FIG. 3. As seen from FIG. 3, the test piece exhibiting the highest figure for the coefficient of friction is embodiment test piece 2, that was applied with blasting treatment and aqueous vapor treatment, the second highest figure piece is embodiment test piece 1, that was applied with aqueous vapor treatment, the third highest figure piece is comparison test piece 2, that was applied with only blasting treatment, and the lowest figure piece is comparison test piece 1, that was applied with no treatment. Embodiment test piece 2 and comparison test piece 2 have less fluctuation in the coefficient of friction compared with embodiment test piece 1 and comparison test piece 1 that were not applied with blasting treatment.

Scuffing Resistance Tests for Group 1:

For another series of test pieces taken from the same Group 1, scuffing resistance was evaluated under the following measuring steps and conditions, using the same sliding friction tester of cylinder-to-cylinder plane contact type, as shown in FIG. 2 and described above.

The tests were conducted by measuring a face pressure when scuffing occurred, as a critical face pressure, at each sliding speed, in a manner that, after a first break-in period of 10 minutes where the sliding speed and thrust load are initially set at 1 m/s and 10 kgf, respectively, and the system is run for 5 minutes, then, the load is increased to 20 kgf and the system is run for another 5 minutes, the system is run with the load successively increased by 5 kgf after each 1 minute run.

Testing conditions were as follows:
Thrust load: increased until scuffing occurs.
Sliding speed: 2 m/s, 4 m/s, and 6 m/s.
Lubricating oil: SAE75W-90.
Oil temperature: 90 deg.C.
Oiling method: dipping.
Counterpart member material: the same as in the friction tests, above.

Figure 4:
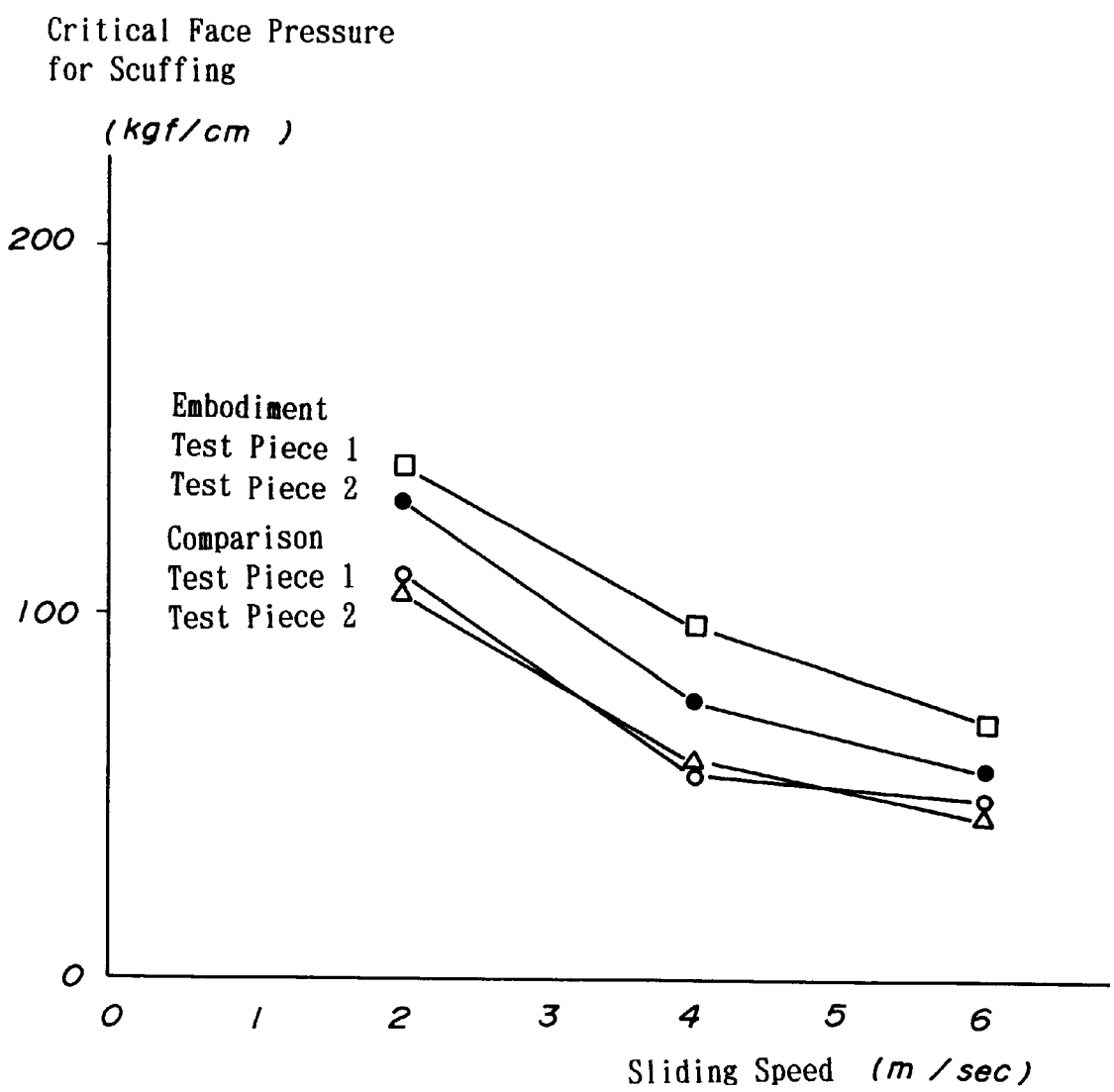
FIG. 4 is a graph showing critical face pressure for scuffing measured with the tester of FIG. 2.

A result for the tests is shown in FIG. 4. As seen from FIG. 4, the test piece exhibiting the best scuffing resistance is embodiment test piece 1, that was applied with aqueous vapor treatment. The second best test piece is embodiment test piece 2, that was applied with blasting treatment and aqueous vapor treatment. Comparison test piece 2, that was applied with only blasting treatment, and comparison test piece 1, that was applied with no treatment are the third and same level. Thus, the embodiment of the present invention, applied with aqueous vapor treatment, is obviously excellent in scuffing resistance.

Test Pieces, Group 2:

Another group (Group 2) of four different test pieces were also produced in the same manner as Group 1, comprising comparison test piece 3 having surface roughness of 15 $\mu$mRz, comparison test piece 4 having surface roughness of 17 $\mu$mRz, embodiment test piece 3 having surface roughness of 30 $\mu$mRz, and embodiment test piece 4 having surface roughness of 35 $\mu$mRz.

Friction Tests for Group 2:

For each test piece of Group 2, time was measured that elapsed before the coefficient of friction reached $\mu$=0.08 level, under the same conditions as the friction tests for Group 1, using a tester, as shown in FIG. 2.

As a result, comparison test piece 3 having surface roughness of 15 $\mu$mRz took 13 hours for the elapsed time, and comparison test piece 4 having surface roughness of 17 $\mu$mRz took 14 hours and 30 minutes for the elapsed time. Embodiment test piece 3 of surface roughness of 30 $\mu$mRz had a coefficient of friction of $\mu$=0.13 when 15 hours elapsed, and embodiment test piece 4 of surface roughness of 35 $\mu$mRz also had a coefficient of friction of $\mu$=0.13 when 15 hours elapsed. From the result, it was known that embodiment test pieces 3 and 4 had less decreasing ratio in the coefficient of friction $\mu$ and better duration characteristics than comparison test piece 3 and 4, provided that the sliding speed is only 6 m/s.

Further Evaluation for Scuffing Resistance Tests:

Additional embodiment test piece 5 having surface roughness of 55 $\mu$mRz was also applied with the same scuffing resistance tests as the tests for Group 1 using the same tester, and compared with Group 1. Embodiment test piece 5 had a critical face pressure for scuffing of 35 kgf/cm$^2$, which is less than 40 kgf/cm$^2$, while embodiment test piece 2 applied with blast and aqueous vapor treatments and having surface roughness of 35 $\mu$mRz had 45 kgf/cm$^2$, and embodiment test piece 1 applied only with aqueous vapor treatment and having surface roughness of 25 $\mu$mRz had 65 kgf/cm$^2$, for critical face pressure for scuffing. Thus, a test piece having a surface roughness less than 55 $\mu$mRz can easily maintain its critical face pressure for scuffing at a level not less than 40 kgf/cm$^2$.

As described above, by implementing the present invention, a synchronizer ring is obtained that advantageously has stable frictional characteristics, excellent synchronizability with and detachability from its counterpart cone, excellent scuffing resistance, does not require working such as grinding and cutting of flame-sprayed coating on its internal circumferential surface, and has stable quality.

While there have been shown and described fundamental novel features of the invention as applied to preferred embodiments thereof, it will be understood that various modifications and changes to such embodiments may be made by those skilled in the art without departing from the spirit of the invention. It is the intention, therefore, to be limited only as indicated by the scope of the claims appended hereto.

What is claimed is:

1. A synchronizer ring made of Fe-based sintered alloy, having an internal circumferential surface, said internal circumferential surface being adapted to detachably engage in synchronized sliding with a rotating counterpart member thereof, at least said internal circumferential surface being applied with aqueous vapor treatment to form iron oxide film thereon.

2. A synchronizer ring according to claim 1, wherein said iron oxide film has surface roughness not less than 20 $\mu$mRz but not more than 55 $\mu$mRz.

3. A synchronizer ring according to claim 1, wherein said iron oxide film has a surface roughness not less than 25 $\mu$mRz but not more than 35 $\mu$mRz.

4. A synchronizer ring according to claim 1, wherein said iron oxide film has a thickness not less than 0.05 $\mu$m but not more than 5 $\mu$m.

5. A synchronizer ring according to claim 1, wherein the major component of said iron oxide film is $Fe_3O_4$.

6. A synchronizer ring according to claim 1, wherein at least said internal circumferential surface is applied with blasting treatment in addition to, and in combination with, said aqueous vapor treatment to form iron oxide film thereon.

7. A synchronizer ring according to claim 2, wherein said iron oxide film has a thickness not less than 0.05 $\mu$m but not more than 5 $\mu$m.

8. A synchronizer ring according to claim 2, wherein the major component of said iron oxide film is $Fe_3O_4$.

9. A synchronizer ring according to claim 2, wherein at least said internal circumferential surface is applied with blasting treatment in addition to, and in combination with, said aqueous vapor treatment to form iron oxide film thereon.

10. A synchronizer ring according to claim 4, wherein the major component of said iron oxide film is $Fe_3O_4$.

11. A synchronizer ring according to claim 4, wherein at least said internal circumferential surface is applied with blasting treatment in addition to, and in combination with, said aqueous vapor treatment to form iron oxide film thereon.

12. A synchronizer ring according to claim 5, wherein at least said internal circumferential surface is applied with blasting treatment in addition to, and in combination with, said aqueous vapor treatment to form iron oxide film thereon.

13. A synchronizer ring according to claim 7, wherein the major component of said iron oxide film is $Fe_3O_4$.

14. A synchronizer ring according to claim 7, wherein at least said internal circumferential surface is applied with blasting treatment in addition to, and in combination with, said aqueous vapor treatment to form iron oxide film thereon.

15. A synchronizer ring according to claim 13, wherein at least said internal circumferential surface is applied with blasting treatment in addition to, and in combination with, said aqueous vapor treatment to form iron oxide film thereon.

* * * * *